United States Patent
Chen et al.

(10) Patent No.: US 11,099,656 B1
(45) Date of Patent: Aug. 24, 2021

(54) LOW-HEIGHT KEY STRUCTURE

(71) Applicant: Primax Electronics Ltd., Taipei (TW)

(72) Inventors: Bo-An Chen, Taipei (TW); Yi-Wei Chen, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 17/031,686

(22) Filed: Sep. 24, 2020

(30) Foreign Application Priority Data

Jul. 24, 2020 (TW) .................................. 109125152

(51) Int. Cl.
*G06F 3/02* (2006.01)
*G06F 1/16* (2006.01)
*H01H 13/70* (2006.01)

(52) U.S. Cl.
CPC .......... *G06F 3/0202* (2013.01); *G06F 1/1616* (2013.01); *G06F 1/1666* (2013.01); *H01H 13/70* (2013.01)

(58) Field of Classification Search
CPC ...... H01H 3/125; H01H 13/186; H01H 3/122; H01H 2223/052; H01H 2231/042; G06F 1/166; G06F 1/1662; G06F 1/1666; G06F 3/0202; G06F 3/0208
See application file for complete search history.

(56) References Cited

U.S. PATENT DOCUMENTS

| 2007/0158172 A1* | 7/2007 | Yatsu | H01H 3/125 200/344 |
| 2009/0078552 A1* | 3/2009 | Takemae | H01H 3/125 200/344 |

* cited by examiner

*Primary Examiner* — Nelson M Rosario
(74) *Attorney, Agent, or Firm* — Kirton McConkie; Evan R. Witt

(57) ABSTRACT

A low-height key structure includes a keycap, a supporting plate, a connecting element, a circuit board and an elastic element. The circuit board is disposed on the supporting plate. A switch element is installed on the circuit board. The connecting element is connected with the keycap and the supporting plate. The keycap is movable upwardly or downwardly relative to the supporting plate through the connecting element. The elastic element is arranged between the keycap and the circuit board. The elastic element includes a contacting part and an elastic support part, which are connected with each other. The contacting part includes a bowl-shaped concave structure. A raised structure is protruded from a middle region of a bottom side of the bowl-shaped concave structure. A top surface of the raised structure is at a level lower than or equal to a top surface of the contacting part.

4 Claims, 4 Drawing Sheets

LOW-HEIGHT KEY STRUCTURE

FIELD OF THE INVENTION

The present invention relates to a structure of an input device, and more particularly to a low-height key structure.

BACKGROUND OF THE INVENTION

In modern societies, electronic devices become indispensable parts in human lives. The electronic products are applied in many sectors, including food, clothing, housing, transportation, education and entertainment. For facilitating carrying and using electronic products, the trends of designing electronic products are toward light weightiness and slimness. Generally, an electronic product is equipped with key structures. For further reducing the thickness of the electronic product, it is necessary to reduce the height. As the overall volume of the keyboard device is reduced, the tactile feel of depressing travel distance of the key structure is possibly lost.

Please refer to FIGS. 1A and 1B. FIG. 1A is a schematic cross-sectional view illustrating a conventional low-height key structure. FIG. 1B is a schematic cross-sectional view illustrating the operation of the conventional low-height key structure. The low-height key structure 9 comprises an elastic element 90, a keycap 91, a connecting element 92, a circuit board 93, a switch element 94 and a supporting plate 95. The switch element 94 is installed on the circuit board 93, and the circuit board 93 is disposed on the supporting plate 95. The circuit board 93 comprises a first film layer 931, a spacer layer 932 and a second film layer 933. The spacer layer 932 is arranged between the first film layer 931 and the second film layer 933. Moreover, the spacer layer 932 has a perforation 9321. The perforation 9321 runs through the spacer layer 932. The switch element 94 is disposed within the perforation 9321. The switch element 94 comprises a first switch unit 941 and a second switch unit 942. The first switch unit 941 is formed on a bottom surface of the first film layer 931. The second switch unit 942 is formed on a top surface of the second film layer 933. The second switch unit 942 is aligned with the first switch unit 941.

The elastic element 90 is arranged between the keycap 91 and the circuit board 93 and aligned with the switch element 94. The elastic element 90 comprises an elastic support part 901 and a contacting part 902. The elastic support part 901 is located under the contacting part 902 and connected with the contacting part 902. The elastic support part 901 has an inner space 9011. The elastic element 90 further comprises a pressing part 9012. The pressing part 9012 is disposed on a middle region of a top side of the inner space 9011 and aligned with the switch element 94. The connecting element 92 comprises a first frame 921 and a second frame 922. The two ends of the first frame 921 and the two ends of the second frame 922 are pivotally coupled to the keycap 91 and the supporting plate 95, respectively. As the first frame 921 and the second frame 922 are moved, the keycap 91 is correspondingly moved downwardly or upwardly relative to the supporting plate 95.

In the situation (ii) of FIG. 1B, an external force F is applied to the keycap 91. In response to the external force F, the keycap 10 is moved downwardly to compress the elastic element 90. Consequently, the elastic support part 901 of the elastic element 90 is subjected to deformation, and the pressing part 9012 is moved downwardly to press the first film layer 931. Consequently, a travel distance is generated. When the first film layer 931 is pressed, the first switch unit 941 on the bottom surface of the first film layer 931 is contacted with the second switch unit 942. Consequently, the switch element 94 is triggered to generate a key signal.

Generally, the height of the keycap 91 of the keycap 91 of the low-height key structure 9 is low. If the pressing part 9012 is longer, the travel distance is shorter. Consequently, the tactile feel of depressing the travel distance of the key structure is not satisfied. On the other hand, if the pressing part 9012 is shorter, the switch element 94 cannot be precisely triggered by the elastic element 90. In other words, the corresponding key signal cannot be generated immediately.

For overcoming the drawbacks of the conventional technologies, the present invention provides a low-height key structure with a specified travel distance. Moreover, the switch element can be precisely triggered to generate the key signal.

SUMMARY OF THE INVENTION

The present invention provides a low-height key structure with a specified travel distance and with enhanced precision of triggering the key signal.

In accordance with an aspect of the present invention, a low-height key structure is provided. The low-height key structure includes a keycap, a supporting plate, a connecting element, a circuit board and an elastic element. The connecting element is connected with the keycap and the supporting plate. The keycap is movable upwardly or downwardly relative to the supporting plate through the connecting element. The circuit board is disposed on the supporting plate. A switch element is installed on the circuit board. The elastic element is arranged between the keycap and the circuit board. The elastic element includes a contacting part and an elastic support part. The contacting part is contacted with a bottom surface of the keycap. The contacting part includes a bowl-shaped concave structure. A raised structure is protruded from a middle region of a bottom side of the bowl-shaped concave structure. The elastic support part is located under the contacting part and connected with the contacting part. The elastic support part has an inner space. A short pressing part is disposed on a middle region of a top side of the inner space and aligned with the switch element. The short pressing part and the raised structure are opposed to each other. A top surface of the raised structure is at a level lower than or equal to a top surface of the contacting part.

In an embodiment, the circuit board includes a first film layer, a spacer layer and a second film layer. The spacer layer is arranged between the first film layer and the second film layer. The spacer layer has a perforation. The perforation runs through the spacer layer. The switch element is disposed within the perforation.

In an embodiment, a first switch unit of the switch element is formed on a bottom surface of the first film layer, and a second switch unit of the switch element is formed on a top surface of the second film layer. The second switch unit is aligned with the first switch unit.

When an external force is applied to the keycap, the elastic support part is subjected to deformation, and the short pressing part is moved downwardly to press the first film layer, so that a first travel distance is provided. When the external force is continuously applied to the keycap, the contacting part is subjected to deformation, the raised structure is pushed by the bottom surface of the keycap, the short pressing part is continuously moved downwardly, and the first switch unit is contacted with the second switch unit, so that a second travel distance is provided.

As mentioned above, the present invention provides the low-height key structure. The short pressing part and the raised structure are disposed within the elastic element. Moreover, the short pressing part and the raised structure are opposed to each other. While the keycap of the low-height key structure is depressed, two consecutive travel distances are provided. Consequently, the tactile feel of depressing the low-height key structure is satisfied. Moreover, due to the arrangement of the short pressing part and the raised structure, the key signal can be precisely triggered in response to the elastic deformation of the elastic element.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
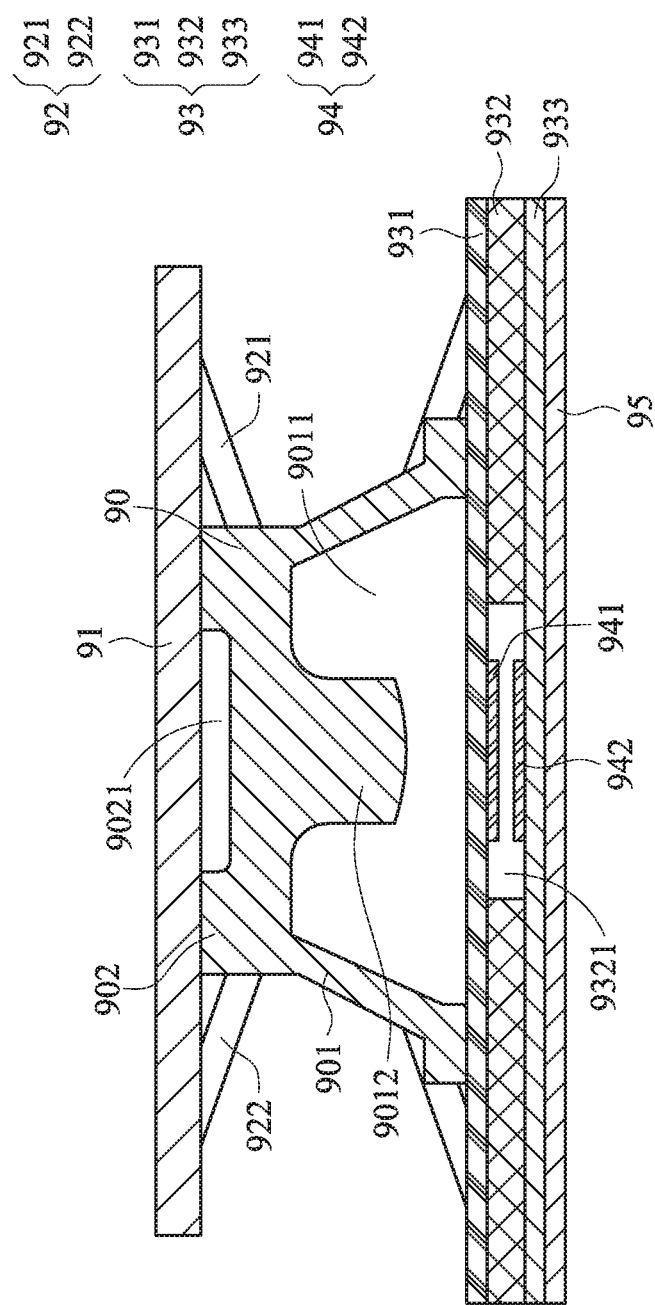
FIG. 1A is a schematic cross-sectional view illustrating a conventional low-height key structure.
Figure 1B:
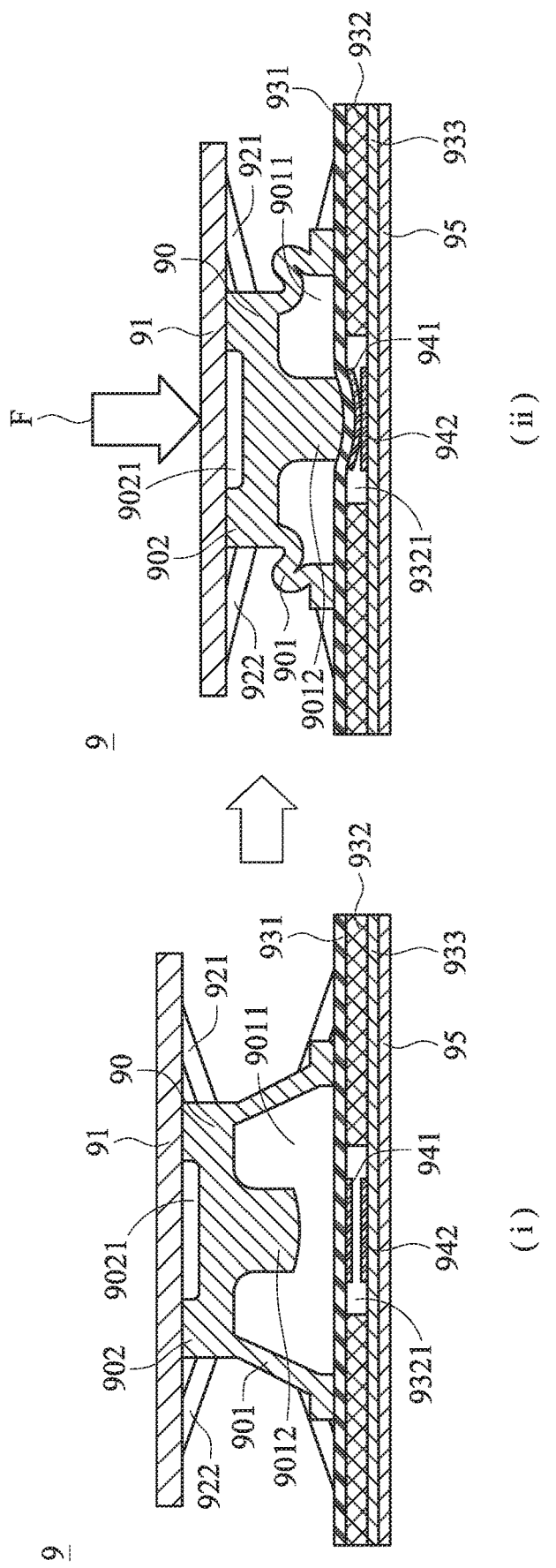
FIG. 1B is a schematic cross-sectional view illustrating the operation of the conventional low-height key structure.
Figure 2A:
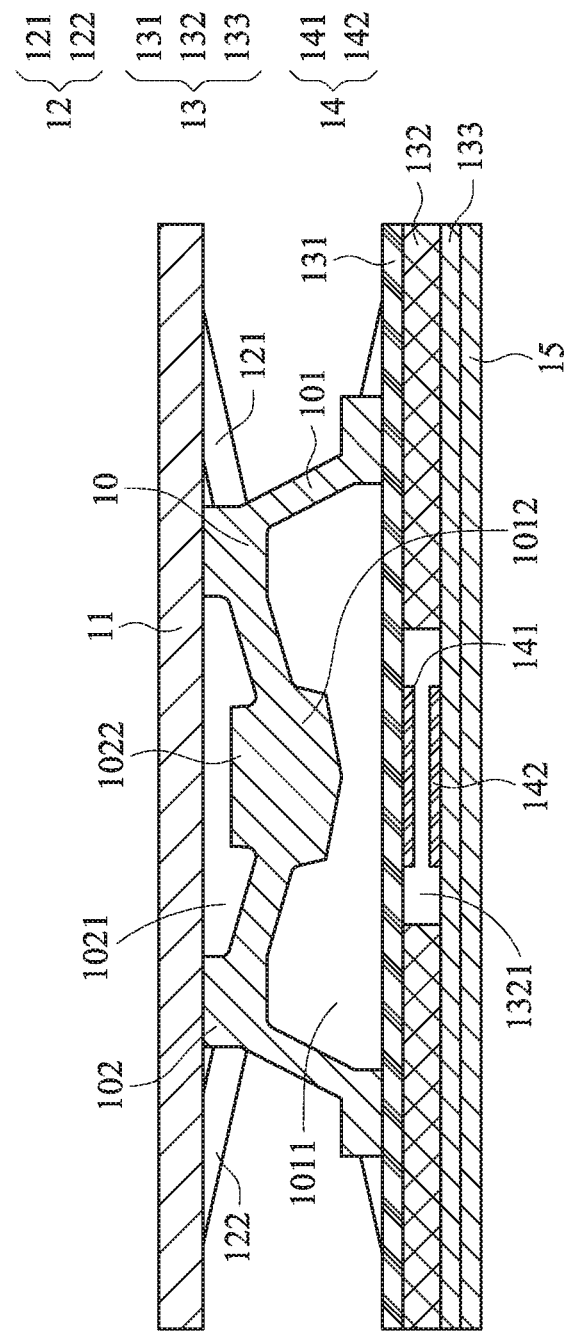
FIG. 2A is a schematic cross-sectional view illustrating a low-height key structure according to an embodiment of the present invention.

Please refer to FIG. 2A. FIG. 2A is a schematic cross-sectional view illustrating a low-height key structure according to an embodiment of the present invention. The low-height key structure 1 comprises an elastic element 10, a keycap 11, a connecting element 12, a circuit board 13, a switch element 14 and a supporting plate 15. The switch element 14 is installed on the circuit board 13, and the circuit board 13 is disposed on the supporting plate 15. In an embodiment, the circuit board 13 comprises a first film layer 131, a spacer layer 132 and a second film layer 133. The spacer layer 132 is arranged between the first film layer 131 and the second film layer 133. Moreover, the spacer layer 132 has a perforation 1321. The perforation 1321 runs through the spacer layer 132. The switch element 14 is disposed within the perforation 1321. The switch element 14 comprises a first switch unit 141 and a second switch unit 142. The first switch unit 141 is formed on a bottom surface of the first film layer 131. The second switch unit 142 is formed on a top surface of the second film layer 133. The second switch unit 142 is aligned with the first switch unit 141.

The elastic element 10 is arranged between the keycap 11 and the circuit board 13 and aligned with the switch element 14. The elastic element 10 comprises an elastic support part 101 and a contacting part 102. The elastic support part 101 is located under the contacting part 102 and connected with the contacting part 102. The contacting part 102 is contacted and connected with the bottom surface of the keycap 11. The elastic support part 101 is attached on the top surface of the first film layer 131. In an embodiment, the contacting part 102 comprises a bowl-shaped concave structure 1021. A raised structure 1022 is protruded from a middle region of the bottom side of the bowl-shaped concave structure 1021. The top surface of the raised structure 1022 is at the level lower than or equal to the top surface of the contacting part 102. The elastic support part 101 has an inner space 1011. The elastic element 10 further comprises a short pressing part 1012. The short pressing part 1012 is disposed on a middle region of the top side of the inner space 1011 and aligned with the switch element 14. The short pressing part 1012 is aligned with the raised structure 1022 within the bowl-shaped concave structure 1021. Moreover, the top side of the inner space 1011 is downwardly inclined from the outermost region to the middle region corresponding to the short pressing part 1012.

Please refer to FIG. 2A again. The connecting element 12 comprises a first frame 121 and a second frame 1222. The first frame 121 and the second frame 122 are pivotally coupled to each other through a rotation shaft (not shown). The two ends of the first frame 121 and the two ends of the second frame 122 are pivotally coupled to the keycap 11 and the supporting plate 15, respectively. As the first frame 121 and the second frame 122 are moved, the keycap 11 is correspondingly moved downwardly or upwardly relative to the supporting plate 15. In an embodiment, the connecting element 12 is a scissors-type connecting element. It is noted that the example of the connecting element is not restricted. In another embodiment, the connecting element includes a V-shaped linkage, an A-shaped linkage or two parallel linkages.

Figure 2B:
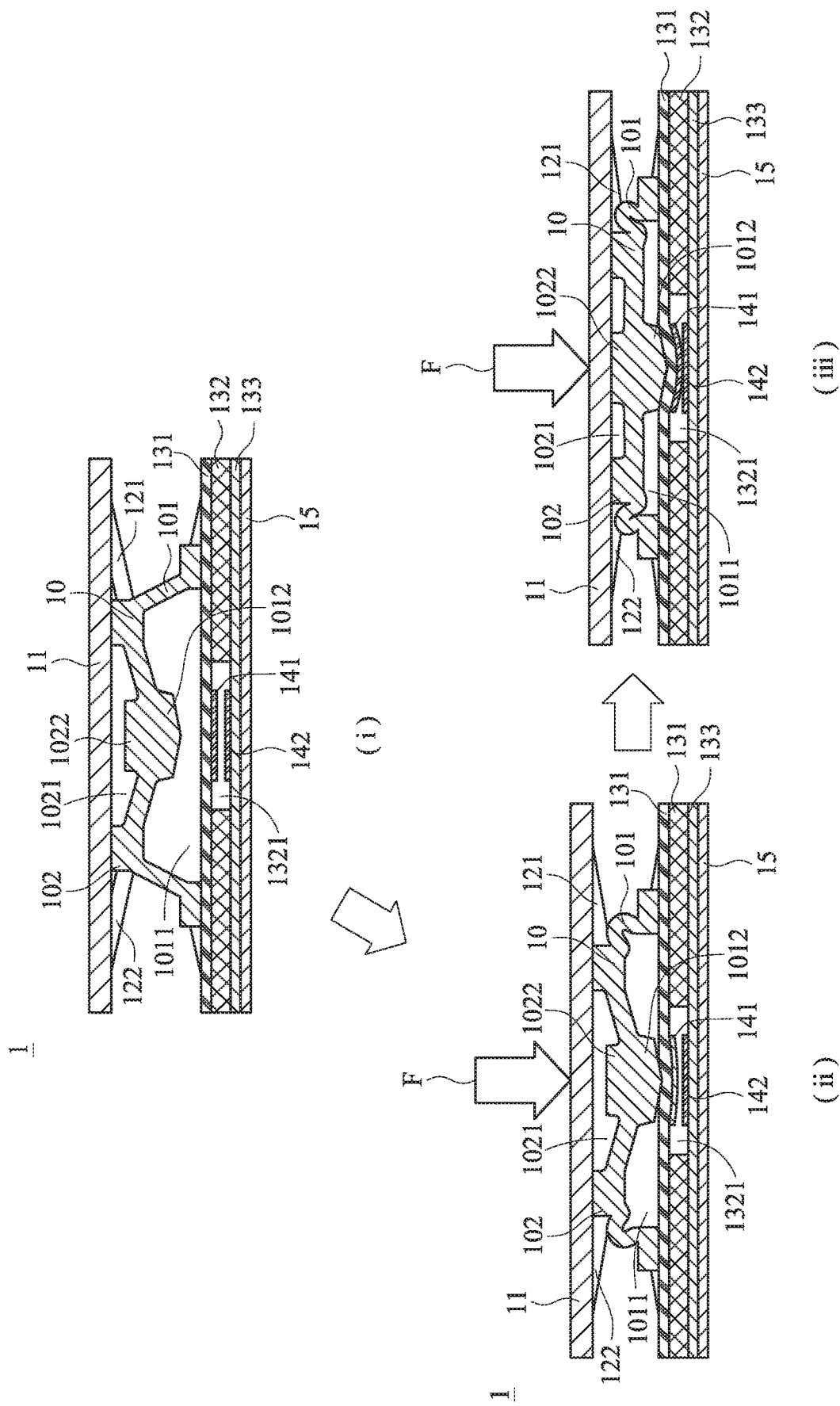
FIG. 2B is a schematic cross-sectional view illustrating the operation of the low-height key structure according to the embodiment of the present invention.

Please refer to FIG. 2B. FIG. 2B is a schematic cross-sectional view illustrating the operation of the low-height key structure according to the embodiment of the present invention.

In the situation (i) of FIG. 2B, a first end of the elastic support part 101 is away from the contacting part 102, and a second end of the elastic support part 101 is connected with the contacting part 102. The first end of the elastic support part 101 is fixed on the top surface of the first film layer 131 in an adhering manner. Consequently, the elastic element 10 is fixed on the circuit board 13. The contacting part 102 is contacted with the bottom surface of the keycap 11. Moreover, the elastic support part 101 provides an elastic restoring force to the keycap 11.

In the situation (ii) of FIG. 2B, an external force F is applied to the keycap 10. In response to the external force F, the elastic support part 101 of the elastic element 10 is subjected to deformation, and the short pressing part 1012 is moved downwardly to press the first film layer 131. Consequently, a first travel distance is provided.

In the situation (iii) of FIG. 2B, the external force F is continuously applied to the keycap 11. In response to the external force F, the keycap 11 is continuously moved downwardly to press the contacting part 102, and the contacting part 102 is subjected to deformation. Consequently, the raised structure 1022 is pushed by the bottom surface of the keycap 11, and the short pressing part 1012 is pushed by the raised structure 1022. As the short pressing part 1012 is continuously moved downwardly, the first switch unit 141 is contacted with the second switch unit 142. Consequently, a second travel distance is provided. When the first switch unit 141 is contacted with the second switch unit 142, the switch element 14 is electrically conducted to generate a key signal.

From the above descriptions, the present invention provides the low-height key structure 1. The short pressing part 1012 and the raised structure 1022 are disposed within the elastic element 10. Moreover, the short pressing part 1012 and the raised structure 1022 are opposed to each other. While the keycap 11 of the low-height key structure 1 is depressed, two consecutive travel distances are provided. Consequently, the tactile feel of depressing the low-height key structure 1 is satisfied. Moreover, due to the arrangement of the short pressing part 1012 and the raised structure 1022, the key signal can be precisely triggered in response to the elastic deformation of the elastic element 10. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A low-height key structure, comprising:
   a keycap;
   a supporting plate;
   a connecting element connected with the keycap and the supporting plate, wherein the keycap is movable upwardly or downwardly relative to the supporting plate through the connecting element;
   a circuit board disposed on the supporting plate, wherein a switch element is installed on the circuit board; and
   an elastic element arranged between the keycap and the circuit board, and comprising a contacting part and an elastic support part, wherein the contacting part is contacted with a bottom surface of the keycap, the contacting part comprises a bowl-shaped concave structure, and a raised structure is protruded from a middle region of a bottom side of the bowl-shaped concave structure, wherein the elastic support part is located under the contacting part and connected with the contacting part, the elastic support part has an inner space, and a short pressing part is disposed on a middle region of a top side of the inner space and aligned with the switch element,
   wherein the short pressing part and the raised structure are opposed to each other, and a top surface of the raised structure is at a level lower than or equal to a top surface of the contacting part.

2. The low-height key structure according to claim 1, wherein the circuit board comprises a first film layer, a spacer layer and a second film layer, wherein the spacer layer is arranged between the first film layer and the second film layer, and the spacer layer has a perforation, wherein the perforation runs through the spacer layer, and the switch element is disposed within the perforation.

3. The low-height key structure according to claim 2, wherein a first switch unit of the switch element is formed on a bottom surface of the first film layer, and a second switch unit of the switch element is formed on a top surface of the second film layer, wherein the second switch unit is aligned with the first switch unit.

4. The low-height key structure according to claim 3, wherein when an external force is applied to the keycap, the elastic support part is subjected to deformation, and the short pressing part is moved downwardly to press the first film layer, so that a first travel distance is provided, wherein when the external force is continuously applied to the keycap, the contacting part is subjected to deformation, the raised structure is pushed by the bottom surface of the keycap, the short pressing part is continuously moved downwardly, and the first switch unit is contacted with the second switch unit, so that a second travel distance is provided.

* * * * *